United States Patent [19]
Davis et al.

[11] 3,900,804
[45] Aug. 19, 1975

[54] MULTITUBE COAXIAL CLOSED CYCLE GAS LASER SYSTEM

[75] Inventors: Jack W. Davis, East Hartford; Allan P. Walch, Manchester, both of Conn.

[73] Assignee: United Aircraft Corporation, East Hartford, Conn.

[22] Filed: Dec. 26, 1973

[21] Appl. No.: 427,960

[52] U.S. Cl. ............... 331/94.5 T; 331/94.5 D; 331/94.5 PE; 330/4.3
[51] Int. Cl. ................................ H01s 3/22
[58] Field of Search .............. 331/94.5; 330/4.3

[56] References Cited
OTHER PUBLICATIONS
Laser Focus, Vol. 8, No. 11, Nov. 1972, pp. 1–4 (4 page brochure by Coherent Radiation).

*Primary Examiner*—Robert J. Webster
*Attorney, Agent, or Firm*—Anthony J. Criso

[57] ABSTRACT

A gas laser design capable of long term reliable operation in a commercial environment is disclosed. Various construction details which insulate the laser optics from mechanical distortions and vibrations inevitably present in the environment are developed. Also, a versatile optical cavity made up of modular units which render the basic laser configuration adaptable to alternate designs with different output capabilities is shown in detail. The system built around a convection laser operated in a closed cycle and the working medium is a gas which is excited by direct current electric discharges.

5 Claims, 7 Drawing Figures

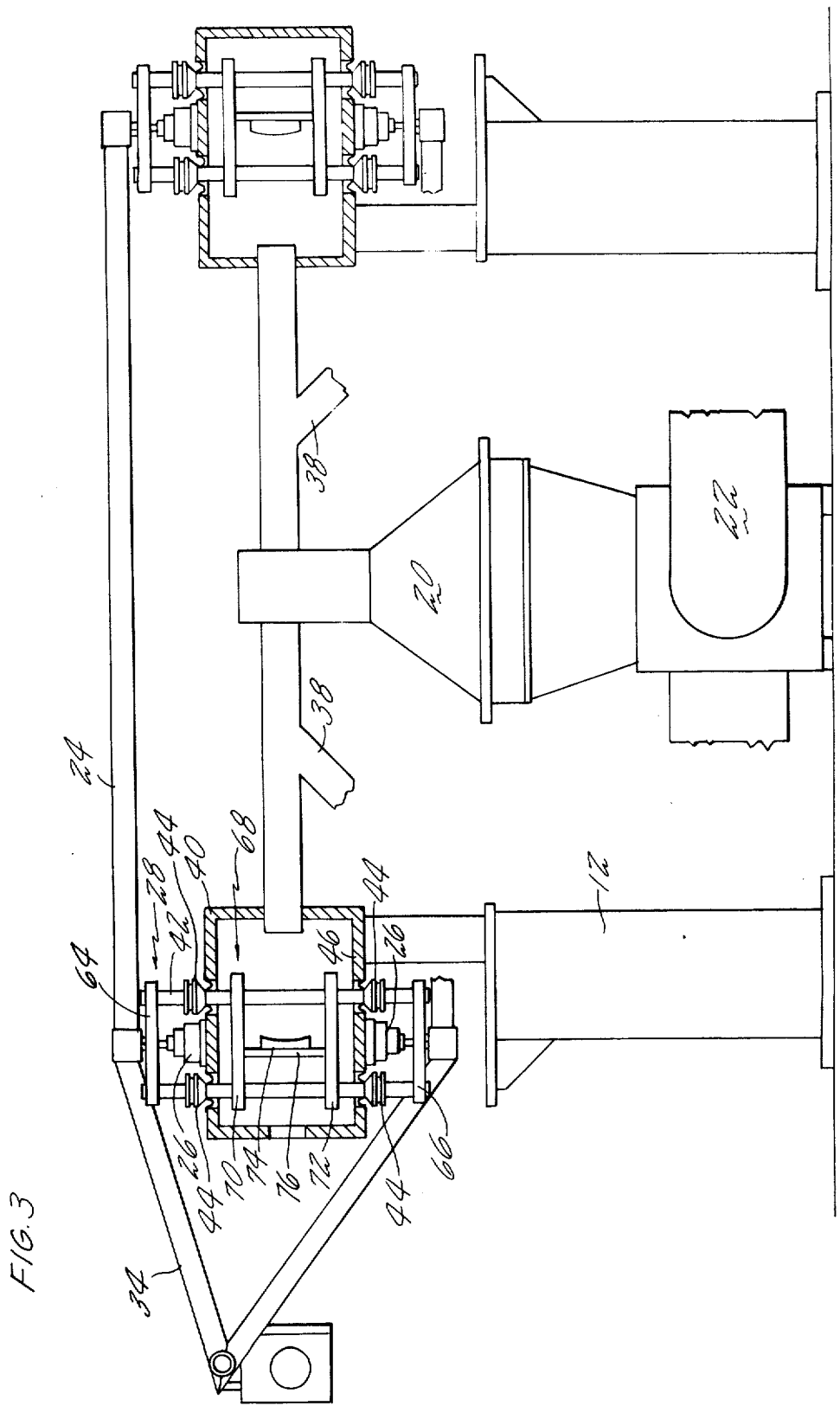

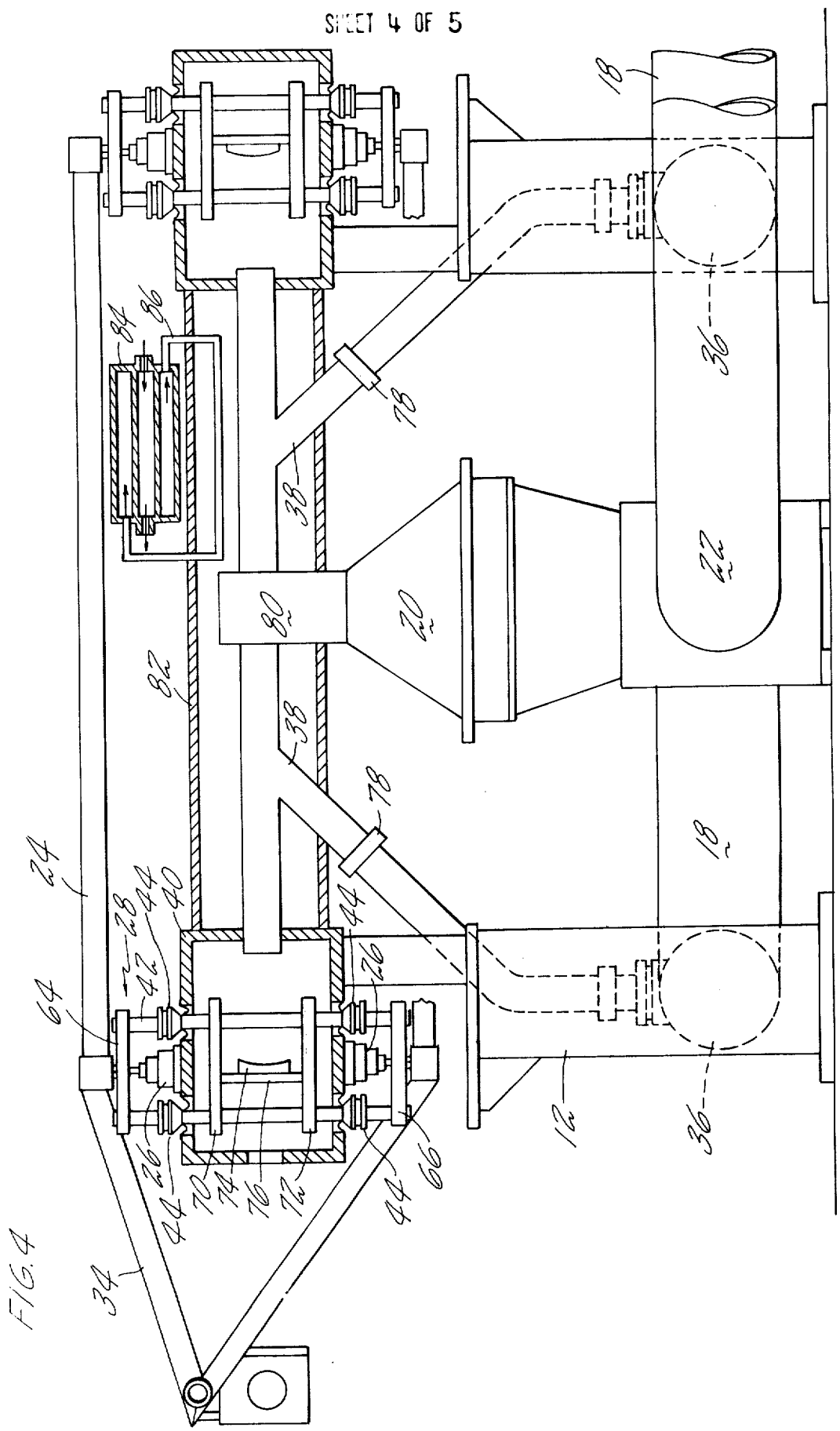

MULTITUBE COAXIAL CLOSED CYCLE GAS LASER SYSTEM

BACKGROUND OF THE INVENTION

1. Field of the Invention

The present invention relates to lasers and more particularly to closed cycle electric discharge gas lasers.

2. Description of the Prior Art

One of the more promising types of laser systems for many commercial applications is the electrically excited flowing gas laser. Common fundamentals of operation are found in all the various configurations of electric systems which can be rather arbitrarily broken into three categories, namely, coaxial lasers, cross beam lasers and cross flow lasers. Probably the simplest of these classes to both describe and operate is the coaxial type in which the flow of gaseous working medium, the direction of the electric discharge and the axis of the optical cavity are colinear within a discharge tube of pyrex or some similar electrical insulator material. The cross beam type lasers have a physical appearance which is much different from the coaxial geometry and leads to different operating characteristics. In a cross beam device the working medium is generally flowed through a channel having a rectangular cross sectional geometry and an electric discharge extending in the flow direction, while the optical axis is transverse to the gas flow and electric discharge. The cross flow configuration, which is the third category of electric discharge laser configurations, is also normally constructed with a gas flow channel having a rectangular cross sectional area. The electric discharge and the optical axis are maintained transverse to the direction of the gas flow and the electric discharge can be either parallel or perpendicular to the optical axis. The cross flow system often requires special means for stabilizing the discharge against the effects of the gas flow. For additional information on various laser geometries see, for example, Buczek et al, U.S. Pat. No. 3,747,015, entitled "Magnetic Stabilized Cross Field Flowing Gas Laser", and Bullis et al., U.S. Pat. No. 3,743,963, entitled "Transverse Gas Laser."

In addition to the different geometrical distinctions described above, electric discharge lasers are often categorized according to the method used to produce the population inversion in the working medium. Apparatus which excites the working medium by a direct electric current discharge in the working medium per se, or by a discharge induced in the medium by suitable radio frequency radiation coupled into the working medium, or augmented by a beam of energetic electrons directed into the working medium, or a photoionization technique, and various combinations of these excitation techniques has been found useful; see, for example, DeMaria, A. J., Review of CW High Power Carbon Dioxide Lasers, Proceedings of the IEEE, Vol. 61, No. 6, June 1973, pgs. 731–748.

Although there is an inherent limitation in the power density which such systems can produce, the coaxial geometry electric discharge lasers are theoretically the simplest devices and from a practical consideration are readily adaptable to commercial laser applications. The simplicity and dependability of a basic coaxial laser system having an output in the several kilowatt range was recognized some time ago as is evidenced by the publication, Wisner, G. R. et al., Unstable Resonators for $CO_2$ Electric Discharge Convection Lasers, Appl. Phys. Letters, Vol. 22, pgs. 4–15, January 1973, which describes a two-tube laser and shows the salient features of a coaxial convection laser. Very simply, an optical resonator is formed with its optical axis coincident with the geometrical axis of two flow tubes placed end to end in the cavity. Each tube has an off axis extension through which the working medium is admitted and permitted to flow along the optical axis and exhausted through a common exit plenum. An electric discharge is maintained internal of each tube between each of two cathodes which is located in the off axis extension of each tube and a common anode at the exit plenum. A special truss structure interconnects the optical surfaces describing the optical cavity.

This coaxial laser system led to the development of a twelve-tube amplifier wherein the stable output from a low power master oscillator is directed into multipass power amplifier optics within the 12-tube geometry, Burwell, W. G., Review of CW High Power Laser Technology, (to be published in The Proceedings of the Third Workshop on Laser Interaction and Related Plasma Phenomena). This system provides a relatively large amount of power from a coaxial configuration; however, the overall apparatus is somewhat impractical for manufacturing operations.

SUMMARY OF THE INVENTION

A primary object of the present invention is to provide a beam of high quality laser radiation in the nominal power range of 1 to 10 kilowatts with equipment designed to operate in a standard commercial environment.

According to the present invention a coaxial laser system having an unstable resonator and a power amplifier produce an annular beam of high quality laser radiation in a structure designed to function in a production environment; the laser gas is admitted to an optical region through two inlet manifolds which direct the flow to a central exit plenum through a plurality of discharge tubes wherein the gas is electrically excited, the tubes being optically in series and electrically in parallel. According further to the present invention, the internal optics which are isolated from surrounding vibrations and mechanical disturbances, insulated against electrical shorting and cooled to minimize temperature variations during operation, are integrated with a mirror alignment system and other optics by a single rigid truss structure which does not contact the laser working medium.

An advantage of the present invention is the availability of a beam of laser radiation which can be reliably directed to various locations over a wide field of interest in a typical commercial production facility. The apparatus can be operated for an indefinite period of time as a closed cycle system having a very small amount of gas replenishment. In addition, the positive branch confocal unstable resonator in the system can be configured for either maximum brightness or maximum power.

A main feature of the present invention is the folded optical path which permits a resonator having a relatively long optical pathlength to be fitted into a relatively short system envelope. An annular mirror couples energy from the unstable resonator into the amplifier and the optics are directionally stable to better than 10 microradians. The folded path optics is a modular construction which permits the length and relative proportions of the oscillator and amplifier to be changed very easily. The main gas circulation piping is formed into a rigid interconnected loop which is soft mounted to the laser section of the system. In addition, the platforms which support the internal optics of the laser are soft mounted from the platform housing and hard mounted to each other with a rigid optical platform truss. The laser gas is excited by direct current electric discharges which are maintained in a plurality of discharge tubes.

The foregoing and other objects, features and advantages of the present invention will become more apparent in the light of the following detailed description of a preferred embodiment thereof as illustrated in the accompanying drawing.

BRIEF DESCRIPTION OF THE DRAWING

FIG. 3 is a simplified schematic side elevation of the optics enclosure and the main support structure;

FIG. 4 is a simplified schematic side elevation showing additional details of the gas flow system and cooling in the optics box;

DESCRIPTION OF A PREFERRED EMBODIMENT

Figure 1:
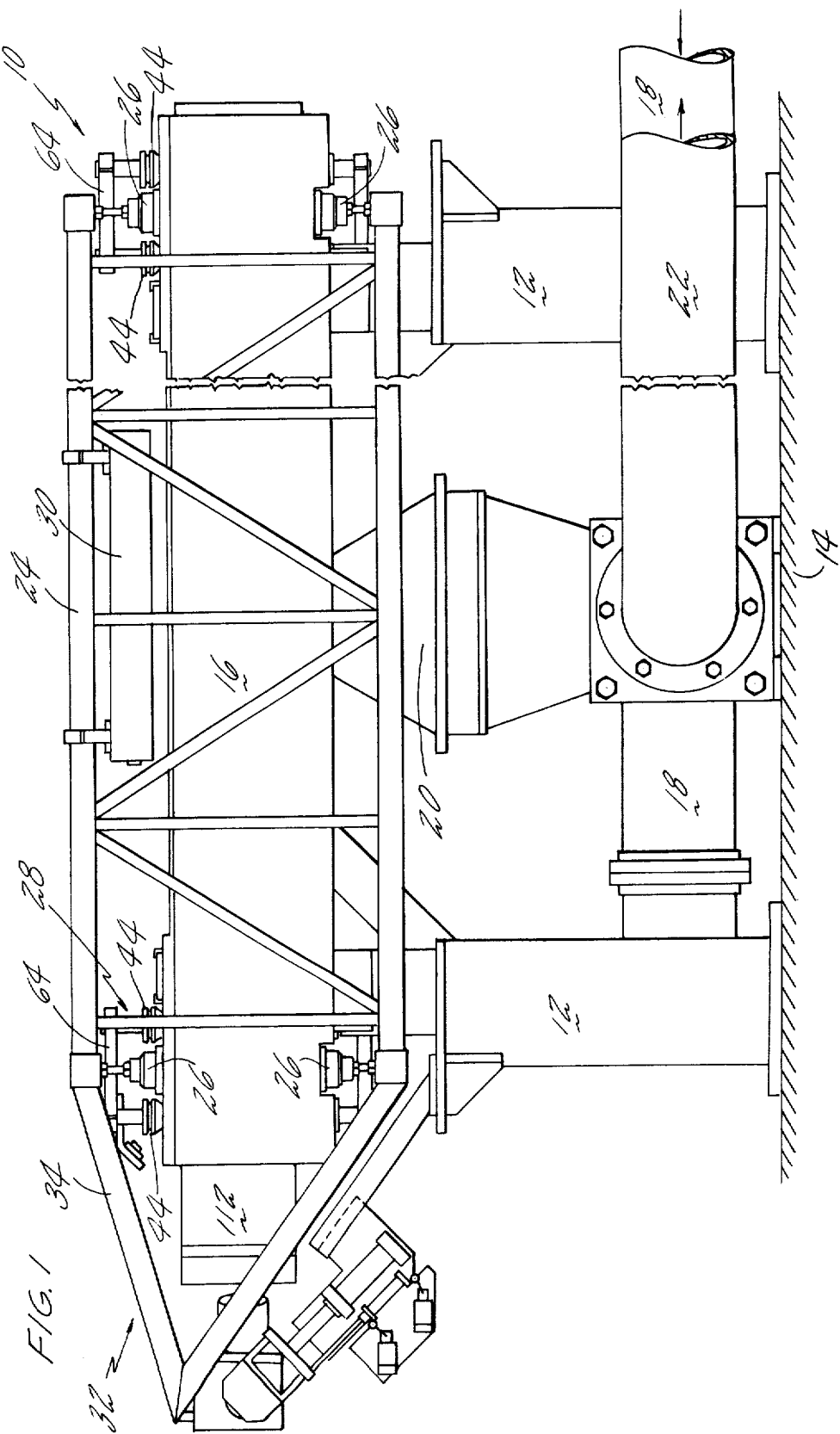
FIG. 1 is a simplified side elevation of the present invention showing various structural detail in some of the major subassemblies in the system.

Referring to the drawing, a simplified side elevation shown in FIG. 1 includes a gas laser 10 which has support legs 12 attached to a ground 14. An optics box 16 envelops a major portion of the laser. The gaseous working medium is delivered to both ends of the laser through a gas supply pipe 18, the gaseous medium exiting from the laser through a discharge plenum 20 and being carried off in a gas discharge pipe 22. An optical platform truss 24 is fixedly suspended with a plurality of vibration mounts 26 which are rigidly attached to an optical platform assembly 28 at each end of the optics box. An alignment device 30 is fixedly attached to the truss and an external optics assembly 32 is positioned with an external support 34 which extends from the platform truss.

Figure 2:
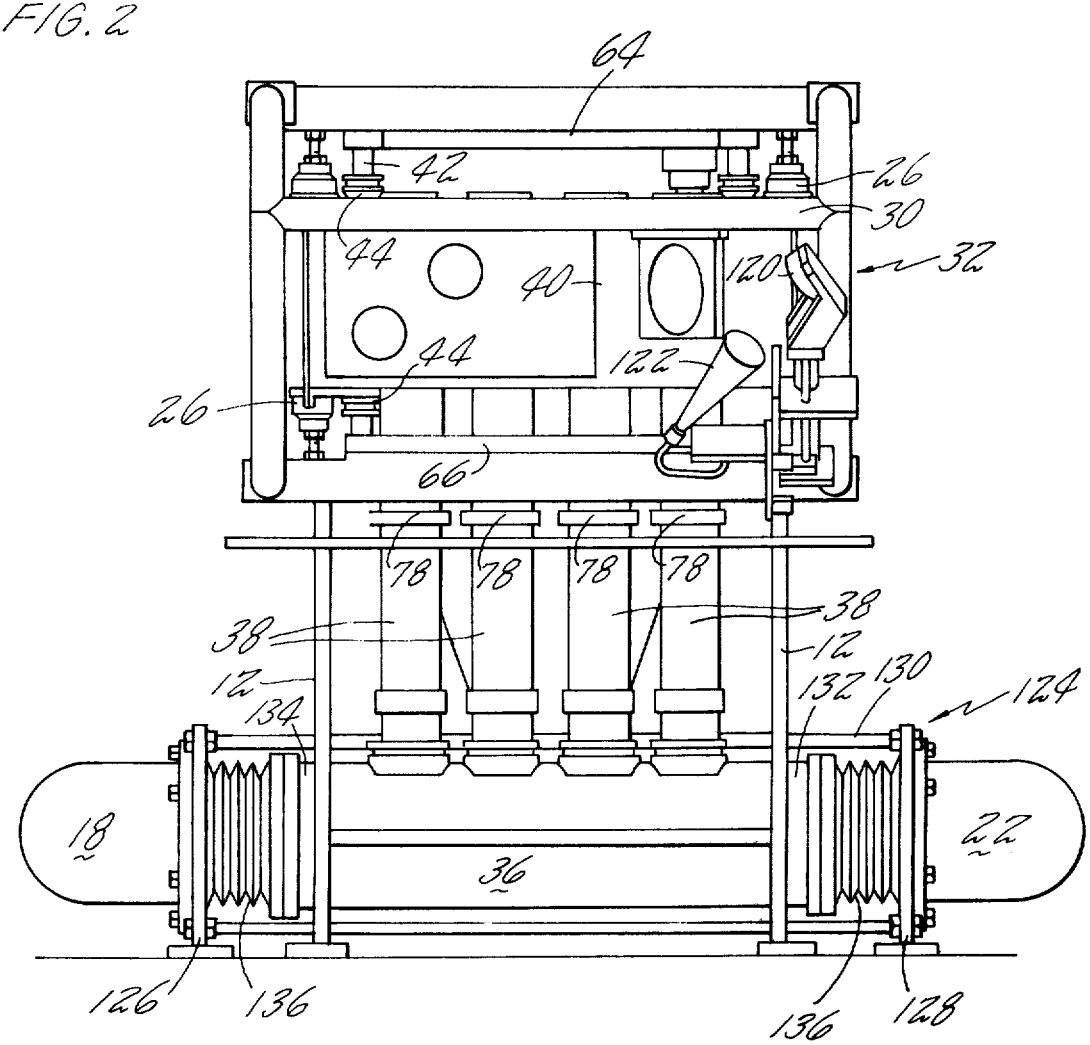
FIG. 2 is a simplified end elevation of the apparatus shown in FIG. 1.

A pair of end inlet manifolds 36, one of which appears in FIG. 2, is joined to a plurality of electric discharge tubes 38 which penetrate the optics box. At each end of the optics box is an optical platform housing 40 which communicates with the discharge plenum through the discharge tubes as is shown in FIG. 3. The platform housings are penetrated by connection rods 42 and flexible seals 44 form a gas tight closure at the locations where a rod penetrates a housing such as in a lower housing plate 46.

The optical platform assemblies 28 have an upper platform assembly plate 64 and a lower platform assembly plate 66; internal to each platform housing is an internal bench 68 which includes an upper bench plate 70, a lower bench plate 72 and reflecting means 74 rigidly attached to a backing plate 76 which connects the upper and lower bench plates. The upper and lower platform assembly plates from each optical platform assembly are fixedly attached to the optical platform truss, the vibration mounts also being fixedly attached to the optical platform housing whereby the platform truss and the platform assemblies mechanically float with respect to the platform housings and their supporting structure which are connected to ground.

One of the major concerns in the construction of the present invention was the isolation of the optics of the system from the effects of distortion in the various ancillary support members due to perturbations such as thermal cycling; also, insulation against the vibrations present in the surrounding environment due to both the operation of the auxiliary equipment and the natural vibrations in the building as well as the electrical isolation of the reflecting surfaces themselves are necessary. The rigid optical structure package which basically includes the optical platform truss 24 and the two optical platform assemblies 28 fixedly attached to the truss has provision for mechanical and electrical isolation. The internal benches 68 which are constructed of a metal such as invar and are at an electric potential higher than ground because of the ionized gas surrounding them are mounted on the connection rods which are made of a dielectric material such as alumina. The rods are mechanically isolated from the optical platform housings 40 which also are constructed of a dielectric material such as fiber glass material by the flexible seals 44. Further, since the rigid optical structure is supported from the optical platform housing by the vibration mounts 26, it is mechanically floating with respect to the support means. For further detail on the mechanical and electrical isolation of the optical system see the related invention described in Caruolo et al., Stable Platform Structure For A Gas Laser, Ser. No. 427,959, now pending filed on even date and having a common assignee.

Additional detail relating to the gas circulation and the electrical discharges are shown in FIG. 4. The gas supply pipe provides working medium to each of the end inlet manifolds 36 and four dielectric tubes which allow the working medium to rise into the horizontal portion of the discharge tubes and flow into the discharge plenum are joined to the top of each manifold. Each tube has an annular cathode ring 78 which is a heavy walled copper orifice to provide long operating lifetime. All tubes penetrate a discharge manifold 80 which serves as a common anode maintained at ground electrical potential. The top, bottom and sides of the horizontal sections of the discharge tubes are covered by a rectangular tube enclosure 82 which is fixedly connected to the optical platform housings. A tube enclosure cooler 84 with a heat absorption loop 86 provides cooling to the interior of the tube enclosure.

The specific system being described is an eight-tube coaxial electric discharge laser. The eight tubes are arranged in series optically and in parallel electrically and flow wise. The tubes are grouped in juxtaposed pairs in a single horizontal plane, six of the tubes being positioned in the oscillator portion and two of the tubes being positioned in the amplifier portion of the laser. The working medium is a mixture of carbon dioxide, helium and nitrogen which is flowed through the laser at a velocity of 300 to 400 feet per second and maintained at a static pressure of nominally 30 torr. The oscillator and amplifier pathlengths are approximately 30 feet and 10 feet, respectively, and the mode diameter of the beam in the 3-inch diameter discharge tubes is approximately 2¾ inches. With the main circulator operating at a capacity of 12,000 cubic feet per minute, 50 kilowatts of direct current electric energy have been applied to the working medium in the eight discharge tubes to provide an output beam containing 7 kilowatts of useful laser power.

For the laser geometry described herein, the overall system has been found to have very good gas tight integrity, resulting in low required rates of makeup feed gas and purging by gas removal. It is not uncommon in many circulating gas laser systems to find that fresh gas must be added to the flowing system at a rate which is in excess of one percent rate at which the working medium passed through the main circulator in order to maintain stable conditions of power in the output beam or to achieve efficient operation. For the present invention operated with the parameters provided above, the operation over a twenty hour period required a nominal makeup feed gas flow of only five one-hundredths of 1 percent of the flow rate of the working medium. The system described herein is an essentially sealed closed loop system which experiences minimal leakage from the surrounding atmosphere into the near vacuum conditions of the low pressure working medium. If air containing water vapor or other contaminants leaks into the circulation loop of the working medium, a very complicated plasma chemistry occurs, particularly in the electric discharge region of the lasers, and the performance of the laser can be degraded significantly.

Figure 5:
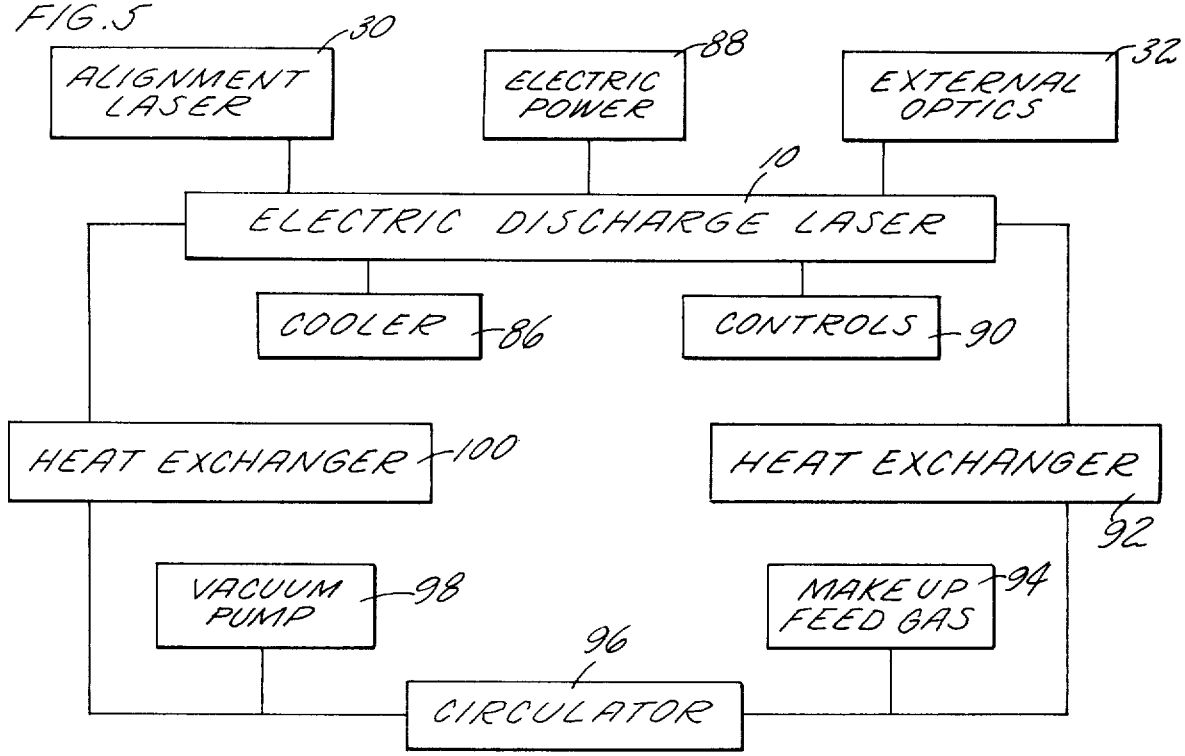
FIG. 5 is a simplified schematic diagram of the overall closed cycle system in accordance with the present invention.
Figure 6:
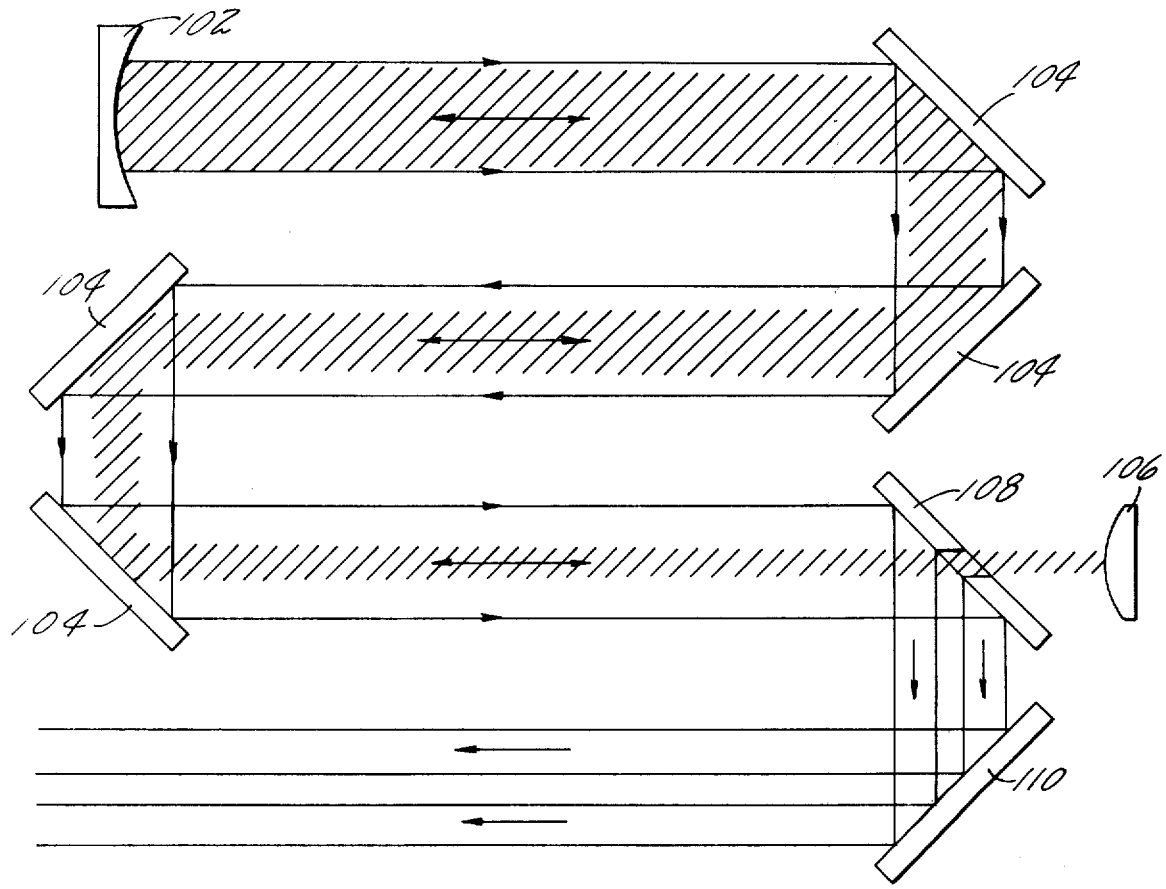
FIG. 6 is a simplified plan view of the optics forming the laser oscillator and amplifier.

The overall system comprising the closed cycle gas laser in accordance with the present invention is shown schematically in FIG. 5. A gaseous working medium enters the electric discharge laser 10 which is serviced by the alignment laser 30, the enclosure cooler 86 and electric power source 88 and controls 90, and the laser produces radiation which interacts with the external optics 32. The working medium leaves the laser section and is cooled in an exhaust heat exchanger 92 which is located in the discharge plenum. A makeup feed gas supply system 94 admixes a prescribed amount of fresh working medium with the main stream and the admixture passes through a main circulator 96 which provides the change in pressure to the working medium required to operate closed cycle. A gas removal system 98 connected to the loop on the high pressure side of the circulator provides the necessary control of the system pressure. The working medium from the circulator is passed through a circulator heat exchanger 100 which removes the work heat absorbed in the working medium due to compression and is readmitted to the laser. The mirror surfaces forming the optical cavity of a preferred embodiment of the present invention are shown in FIG. 6. A concave end mirror 102 in combination with four flat turning mirrors 104 and a convex end mirror 106 describe the resonator portion of the cavity; the end mirrors describe a folded path, positive branch, confocal unstable resonator. A flat annular mirror 108 couples a beam of radiation having an annular cross section out of the resonator and onto a flat amplifier mirror 110 which redirects the annular beam through the amplifier portion of the cavity. The nominally 30 foot long unstable resonator is feasible because of the carefully prepared concave mirror which has a radius of curvature in the range of 100 to 150 feet. The construction of curved mirrors having a longer radius of curvature has been found to be impractical for commercial applications.

Figure 7:
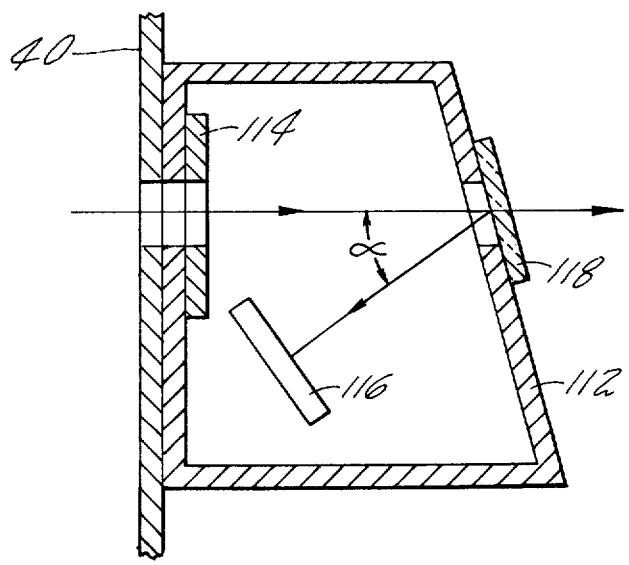
FIG. 7 is a simplified schematic of the output window chamber.

An output window chamber 112 containing a shutter 114, a beam catcher 116 and an output window 118 is attached to the optical platform housing having an external optical assembly as shown in FIG. 7. The window is located in the path of the output beam with the flat surfaces of the window being offset at a small angle alpha so that the radiation reflected by the surfaces is not directed back along the axis of the laser. The beam catcher is positioned in the path of the surface reflected radiation to catch this energy, thereby avoiding structural damage or other deleterious effects. The shutter is movably attached to the inside of the output window chamber; this allows the output window to be changed without destroying the vacuum in the optical platform housing.

Normally, the laser is operated continuously even though the output beam may be intermittently delivered to the work area. During an interruption, the beam is diverted from its normal path by a diverting mirror 120 which redirects the full output beam into a calorimeter 122 as shown in FIG. 2. The diverting mirror has a sharp straight leading edge and is slid across the output beam. In this manner, the output beam is directed either to the target area or to the calorimeter with no spurious reflections to the general environment which could result if the diverting mirror were rotated into the path of the output beam. The position of the diverting mirror is controlled by a pneumatic cylinder in combination with an electric solenoid in a fail safe system; unless suitable air pressure is delivered to the pneumatic cylinder and a controlled electric potential delivered to the solenoid, the diverting mirror remains in the path of the laser output beam, thereby diverting the beam into the calorimeter. The inside of the calorimeter is blackened to enhance its absorbtivity and essentially all the diverted beam is absorbed on the inner surfaces of the calorimeter. The calorimeter is calibrated to measure the output power from the laser; this result is accomplished typically by temperature measurements with appropriate thermocouples.

Special care has been taken in the design of the gas supply and discharge pipes particularly in the vicinity of the discharge plenum where they are solidly bolted to one another through a standoff device 124; the device includes a first 126 and a second 128 bolting plate interlocked to one another as shown in FIG. 2 by a plurality of standoff rods 130. A plenum pipe 132 which joins the discharge plenum to the exhaust pipe is rigidly connected to a splitting pipe 134 which joins the inlet pipe to the inlet manifolds in order to avoid imposing side loadings on the laser as a result of the pressure differential inside and outside the pipes. Further, the pipes 132, 134 are soft connected to the standoff device with flexible bellows 136 to insulate the laser from vibrations in the main circulating system. An important structural requirement of the standoff device is that the cross section area of the inlet and outlet pipes be equal and perpendicular to a common axis through the geometric centers of the cross sections to avoid loading the discharge plenum with twisting moments. Also, the main circulator, its drive motor and the circulator heat exchanger are mounted on support pads separate from the optical apparatus to minimize the overall amount of vibration transmitted to the laser.

Cooling is required at several locations in the system. The location at which the largest amount of heat is removed from the system is the exhaust heat exchanger 92. In this unit substantially all of the electric discharge power which is not converted to laser radiation is removed from the working medium; conventional water cooled fin and tube construction is used. Another location at which a relatively large amount of heat is removed from the working medium is the circulator heat exchanger 100 which is also a water cooled fin and tube device which removes the pump work absorbed by the flowing gas during compression. Each of the mirrors in the oscillator and amplifier is also cooled. The amount of heat absorbed from the mirrors is not as great as in the systems described above, however, mirror cooling is critical to prevent distortion and damage to the surfaces of the mirrors due to the high radiant flux on their surfaces. The mirrors are a special design with intricate fluid passages behind the reflecting surface to permit water cooling of the mirror. This technique is known in the art and is discussed generally in U.S. Pat. No. 3,645,608, Cooling Means For Reflecting Device, Staley et al. The cooling is done with distilled water since the mirror surfaces are an electric potential which is above ground. Although the exact cooler design is unimportant, the removal of excess heat from the interior of the rectangular tube enclosure 82 is very significant. A great deal of heat is produced in the electric discharge tubes during normal operation, some of which can rise through the upper portion of the optical platform truss, causing thermal variations in the truss and optical misalignment. The rectangular tube enclosure protects the electric discharge tubes from physical damage and prevents the convective transfer of heat to the truss; in addition the tube enclosure contributes significant stiffening to the entire optics box thereby reducing the warpage or distortion which might otherwise occur resulting in unwanted forces on the truss. The tube enclosure cooler maintains the temperature of the gases on the outside of the discharge tubes at approximately room temperature and a circulating fan located internal of the rectangular tube enclosure continuously recirculates the gas to provide a more uniform temperature distribution throughout the tube enclosure. In addition to the cooling described above, the calorimeter, the diverting mirror, and the beam catcher each require appropriate cooling during operation of this system.

Although this invention has been shown and described with respect to a preferred embodiment thereof, it should be understood by those skilled in the art that various changes and omissions in the form and detail thereof may be made without departing from the spirit and scope of the invention.

Having thus described a typical embodiment of our invention, that which we claim as new and desire to secure by Letters Patent of the United States is:

1. A closed cycle system for the production of laser radiation with a gaseous working medium which is circulated in a loop through the system comprising:

a convection laser having a gas inlet and a gas discharge and including:

an unstable resonator section formed between two curved reflecting surfaces which have a common optical axis about which is positioned a plurality of electric discharge tubes;

means for providing an electric discharge along the optical axis to produce laser radiation in the resonator;

a flat reflecting surface positioned on the axis to couple laser radiation from the resonator as an output beam having an annular cross section; and means for cooling the laser reflecting surfaces;

an exhaust heat exchanger which provides cooling to the working medium;

first flow means joining the laser gas discharge to the exhaust heat exchanger;

a main circulator for maintaining continuous circulation of the working medium through the laser loop;

second flow means joining the exhaust heat exchanger to the main circulator, and second flow means including means for insulating the exhaust heat exchanger from vibrations in the main circulator;

a circulator heat exchanger which provides cooling to the working medium;

third flow means joining the circulator heat exchanger to the circulator;

fourth flow means joining the circulator heat exchanger to the laser inlet, the fourth flow means including means for insulating the laser inlet from vibrations in the circulator heat exchanger;

a makeup feed gas supply joined to the one of flow means to provide a continuous fresh supply of working medium;

a gas removal system joined to the third flow means to maintain steady state pressure conditions in the system loop and to remove contaminants from the working medium during operation of the system; and a standoff device fixedly interconnecting the second and fourth flow means for avoiding the imposition of side loadings on the laser as a result of pressure differentials inside and outside of said flow means and for avoiding loading at least part of the flow means with twisting moments.

2. The invention according to claim 1 in which the convection laser includes further a laser amplifier section through which is passed the annular output beam from the resonator section.

3. The invention according to claim 2 including further a tube enclosure which completely surrounds the electric discharge tubes.

4. The invention according to claim 3 including further heat transfer means for controlling the temperature inside the tube enclosure.

5. The invention according to claim 1 wherein the unstable resonator has an optical path which is folded.

\* \* \* \* \*